Feb. 10, 1970                E. L. ECKFELDT                3,495,167
         BALANCEABLE SYSTEMS USING DIODE-RINGS FOR NULL
              MEASUREMENT OF IMPEDANCE OR RECIPROCAL THEREOF
Filed May 24, 1968                                    2 Sheets-Sheet 2

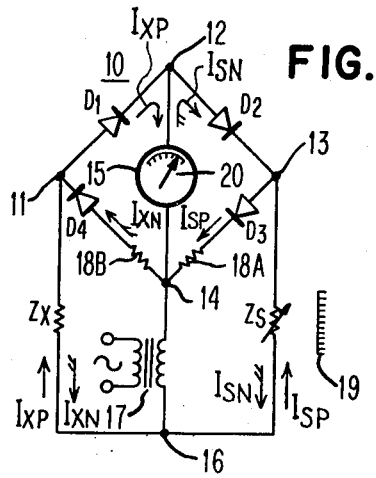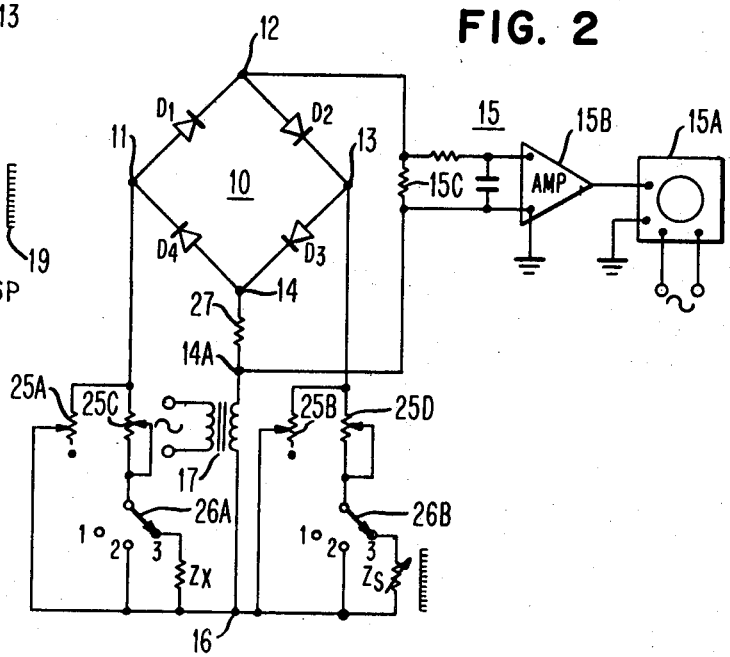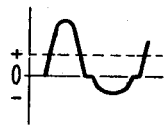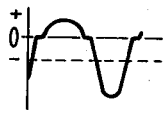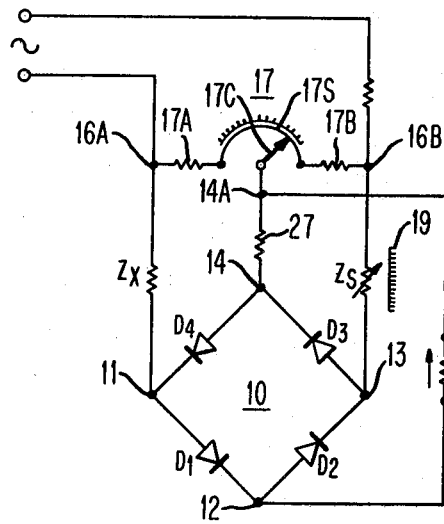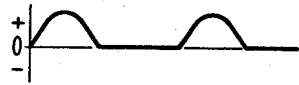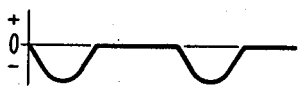

United States Patent Office 3,495,167
Patented Feb. 10, 1970

3,495,167
BALANCEABLE SYSTEMS USING DIODE-RINGS
FOR NULL MEASUREMENT OF IMPEDANCE
OR RECIPROCAL THEREOF
Edgar L. Eckfeldt, Ambler, Pa., assignor to Leeds &
Northrup Company, Philadelphia, Pa., a corporation
of Pennsylvania
Continuation-in-part of application Ser. No. 310,310,
Sept. 20, 1963. This application May 24, 1968, Ser.
No. 731,800
Int. Cl. G01r 27/00, 27/02
U.S. Cl. 324—57                                10 Claims

ABSTRACT OF THE DISCLOSURE

A network, using a DC detector, for comparing two impedances while providing alternating current flow through both of them. The impedances are each connected to the AC source to provide a first terminal from the first impedance, a second terminal from the second impedance and a third terminal from the AC source. A four-diode ring forms four intermediate points. The first and second terminals are connected to opposite points of the ring. The third terminal is connected to a branch between the remaining opposite points of the diode ring. The branch includes the DC detector. For measurement of the unknown impedance, the network is balanced for null response of the DC detector.

Cross-reference to related applications

This application is a continuation-in-part of my copending application Ser. No. 310,310, filed Sept. 20, 1963 and which issued Aug. 27, 1968 as Patent No. 3,399,037.

Background of the invention

In many instances, measurement of resistance and/or conductance can be made with a Wheatstone bridge using direct current, in which cases there is little difficulty in providing suitable means for ascertaining bridge balance. However, in other cases, for example, measurement of electrolytic conductivity, it is required that an alternating current source be used. While detectors of the AC type are available, they are generally more expensive and involve more complex circuitry than detectors of the DC type.

Summary of the invention

In accordance with the present invention, a DC detector is connected between one pair of opposite terminals of a four-terminal network comprising a diode ring. The unknown and known impedances are connected in series between the other pair of opposite terminals of the network. The AC supply source is connected to resistance means having a resistance substantially equal to that of the DC detector at one of the terminals of the first pair and via said impedances to both terminals of the other pair. In such arrangement, the diodes of the network provide that current flows through the known and unknown impedances for both negative and positive halfcycles of the AC supply frequency that supply DC pulses to the detector. For measurement of the unknown impedance, the response of the detector to DC halfwaves supplied to it, via diodes of the ring network and the known and unknown impedances, is nulled.

More particularly in some embodiments of the invention, a two-terminal AC source is connected between one of the detector terminals of the diode ring network and a common terminal of the known and unknown impedances. In these embodiments, the detector receives current through the unknown impedance for halfwaves of one polarity and through the known impedance for halfwaves of the other polarity; both impedances pass current for halfwaves of both polarities. In these embodiments, the known impedance is continuously variable and nulling of the detector response is effected by adjustment of the known impedance.

In other embodiments of the invention, the AC source is effectively connected in series between the known and unknown impedances with an intermediate tap to the detector so that for halfwaves of one polarity, the detector receives current in one direction or the other if the network is unbalanced. Again both impedances pass current for halfwaves of both polarities. In these embodiments, nulling of the detector response may be effected by adjustment of the known impedance and/or adjustment of an impedance in a voltage-divider network associated with the AC supply source.

The invention further resides in measuring circuitry having features of construction, combination and arrangement hereinafter described and claimed.

Brief description of the drawings

For a more detailed understanding of the invention, reference is made in the subsequent description of preferred embodiments thereof to the accompanying drawings in which:

FIG. 1 schematically illustrates a measuring circuit using one basic form of the invention;

FIG. 2 schematically illustrates a modification of FIG. 1;

FIGS. 2A and 2B are explanatory figures referred to in discusion of FIGS. 1 and 2;

FIG. 3 schematically illustrates a measuring circuit using another basic form of the invention;

FIGS. 3A and 3B are explanatory figures referred to in discussion of FIG. 3;

Description of preferred embodiments

Figure 4:
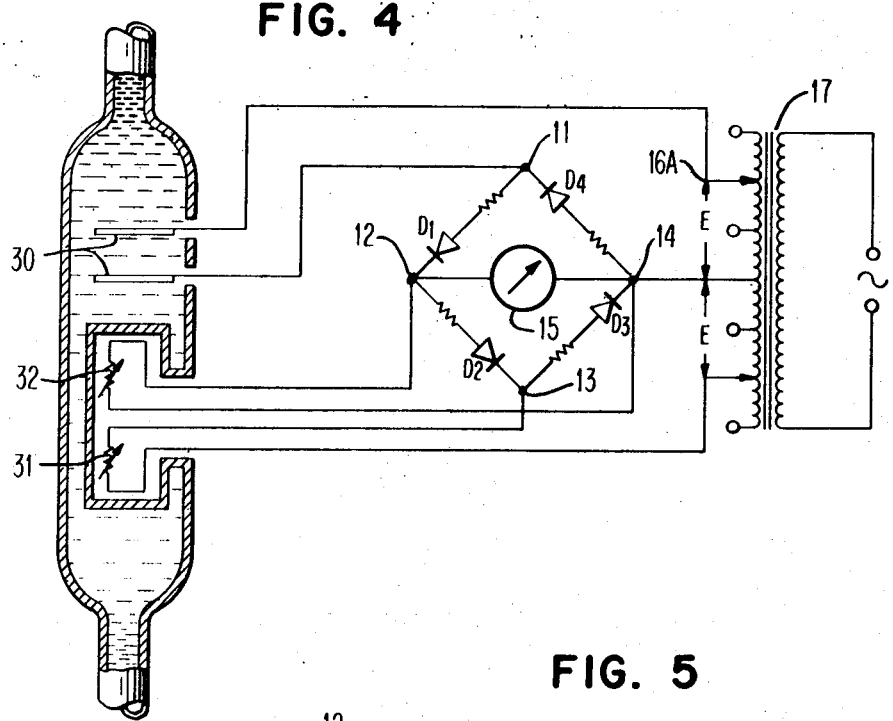
FIG. 4 is similar to FIG. 1 with addition of elements for conductivity measurements of dilute aqueous solutions.

Referring to FIG. 1, the diodes D1–D4 are included in a four-terminal network 10 and are similarly poled to form a diode ring. A detector means 15, illustrated as a center-zero galvanometer, is connected between one pair of opposite terminals 12, 14 of network 10. The unknown impedance $Zx$ and the known or calibrated impedance $Zs$ are connected in series between the other pair of opposite terminals 11, 13 of network 10.

In this form of the invention, the known and unknown impedances $Zs$, $Zx$ are directly connected between network terminals 11, 13 and have a common connection or terminal 16. An AC source 17 is connected between terminal 14 of network 10 and the common connection 16 of the known and unknown impedances. For halfwaves of the source voltage for which terminal 16 is positive with respect to terminal 14, current $Ixp$ flows from terminal 16 through unknown impedance $Zx$ through diode D1 to terminal 12 of network 10 and through detector means 15 to terminal 14. Current $Isp$ of the same halfwave polarity flows from terminal 16 through calibrated impedance $Zs$ to terminal 13 of network 10, then through diode D3 to terminal 14. In short, when source terminals 16 and 14 are respectively positive and negative, current flows through both impedances $Zx$, $Zs$, but detector means 15 is traversed only by current through unknown impedance $Zx$.

For halfwaves of the source voltage for which terminal 14 is positive with respect to terminal 16, current $Isn$ flows from terminal 14 through detector means 15 to terminal 12 of network 10, through diode D2 to terminal 13, then through calibrated impedance Zs to terminal 16. Current Ixn of the same halfwave polarity flows from terminal 14 through diode D4 to terminal 11 of network 10 and then through unknown impedance Zx to terminal 16. In brief, when source terminals 14 and 16 are respectively positive and negative, current flows through both impedances Zx, Zs, but detector means is traversed only by current through the known or calibrated impedance Zs.

Assuming the impedances Zs and Zx are equal, the current pulses traversing detector means 15 in alternate halfcycles are equal and opposite, having a net DC component of zero. Thus, there is accordingly a null response of the detector means 15. If, for example, detector 15 is a DC galvanometer, the needle either remains at zero or quivers about zero, depending upon the source frequency and the damping of the galvanometer movement. Detector means 15 may, of course, be of other DC types, as for example, the oscilloscope arrangement later described.

If the unknown impedance Zx is less than Zs, the current pulses Ixp, through the impedance Zx and detector 15, are greater than the current pulses Isn of opposite polarity through the impedance Zs and detector 15 (FIG. 2A). Accordingly, the detector 15 responds to the net positive DC component. If, on the other hand, the unknown impedance Zx is greater than Zs, the current pulses Isn through impedance Zs and detector 15 are greater than the current pulses Ixp through impedance Zx and detector 15 (FIG. 2B): accordingly, the detector 15 responds in opposite sense to the negative DC component. A null method of measurement is used: the impedance Zs is adjustable over a range of values and is associated with the calibrated scale 19. With Zs adjusted for null response of detector 15, the value of the unknown impedance Zx can be read from scale 19.

When it is desirable or necessary that the circuit operate without flowing of any DC component through impedance Zx (i.e., that the positive and negative pulses Ixp, Ixn traversing the unknown impedance Zx shall be approximately equal), resistance 18B is included in series with diode D4 so that for pulses Ixn, the effective resistance of the arm between terminals 11, 14 of network 10 is substantially equal to the forward resistance of diode D1 plus the input resistance of detector 15. Similarly, a resistance 18A may be included in series with diode D3 so that for pulses Isp, the effective resistance of the arm between terminals 13, 14 of network 10 is substantially equal to the forward resistance of diode D2 plus the input resistance of detector 15.

In the above discussion of the operation of FIG. 1, it was, for simplicity, assumed that all of the current Ixp through the unknown impedance Zx traversed detector 15 and that all of current Isn through the known impedance Zs traversed detector 15. Actually, in normal operation, all of the current pulse Ixp does pass through the detector since the diode D3 (in the possible shunt path D2 through D3) has a voltage drop across it from the current pulse Isp passed through Zs. This voltage drop prevents shunting of the current pulse Ixp away from the detector for all values of Ixp which produce a voltage drop in the detector less than the voltage drop in diode D3 from current pulse Isp.

Larger voltage drops in the detector would produce a shunting current through diode D2 in the absence of resistor 18A. If 18A has the same resistance as the detector, the drop of current Isp flowing through 18A will add to the drop in diode D3 and reverse the voltage on diode D2, thus preventing any shunting of current pulse Ixp away from the detector.

By symmetrical reasoning, a resistor 18B (preferably equal in value to the resistance of the detector) can be inserted in series with diode D4.

When current pulse Ixp is much larger than current pulse Isp, there will be shunting of much of Ixp away from the detector and this is desirable to prevent damage of the detector.

It should now be obvious to those skilled in the measuring art that if the impedance Zx is substantially a pure resistance, the known impedance Zs should be of similar nature, i.e., a pure resistance, and the associated scale 19 may be calibrated to read directly in units of resistance and/or conductance: if the impedance Zx is a pure capacitance, for example, the known impedance Zs should also be a pure capacitance and scale 19 may be calibrated to read directly in terms of capacitance irrespective of source frequency. If impedance Zx is not a pure resistance but has a reactance which is small compared to its resistance, a balance can be obtained when Zs is a pure resistance and the error in measuring the resistance component is very small.

Except for differences below discussed, the circuitry of FIG. 2 is similar to that of FIG. 1 and, accordingly, the components are identified by similar reference characters so that it is unnecessary to repeat their description, connections and cooperation.

It will be noted in FIG. 2 that a resistor 27 is connected between points 14 and 14a and the resistors 18A and 18B of FIG. 1 are not included in the diode ring of FIG. 2. The single resistor 27 of FIG. 2 serves the same function as the two resistors 18A and 18B of FIG. 1. The resistor 27 is part of a branch circuit which connects with points 14 and 12 of the diode ring. The branch circuit also includes the detector 15. When the values are made equal, the circuit operates without any DC component flowing through impedances Zs and Zx, which is especially desirable when the impedance Zx is an electrolytic conductivity cell.

In addition, in FIG. 2 the detector means 15 comprises an oscilloscope 15A an amplifier 15B and a smoothing filter network 15C. Although the input terminals of filter network 15C may be connected directly to ring-junction points 12,14 of FIG. 1, they are connected, in FIG. 2, between points 12 and 14A. At balance, the successive halfwaves Ixp, Ixs are equal and opposite and, in consequence, the output of the filter has no DC component. Accordingly, the display on the oscilloscope 15A is a wave attenuated by the filter, but symmetrical with respect to a horizontal line which is the zero reference line of vertical displacement. If the Ixp pulses are greater than the Ixs pulses, the oscilloscope 15A displays a wave, attenuated by the filter, which is unsymmetrical with respect to the zero reference line. The lack of symmetry is most apparent as a displacement of the wave in the positive direction from the zero reference line (FIG. 2A). This indicates an average DC through the detector in the positive direction and indicates that Zs should be decreased for balancing the circuit. Conversely, if the display of the oscilloscope appears to be a wave displaced in the negative direction from the zero reference line (FIG. 2B), this indicates an average DC through the detector in the negative direction and further indicates that the calibrated impedance Zs should be increased for balancing the circuit for readout of the value of Zx.

To insure that the diodes D1–D4 operate under favorable voltage-resistance characteristics for a wide range of values Zx, the circuit of FIG. 1, like that of FIG 2, may be provided with two pairs of resistances 25A, 25B and 25C, 25D, at least one resistance in each pair being adjustable. These pairs of resistances are selected by switches 26A, 26B respectively. With the known and unknown impedances Zs, Zx excluded from circuit, as by setting switches 26A, 26B in the number 1 position, at least one of the resistances 25A, 25B is adjusted for null response of detector means 15. Such calibration adjustment usually need be checked only infrequently. After such nulling calibration of the circuit, the impedances Zs, Zx are then connected respectively in shunt with resistances 25B, 25A, as by setting switches 26A, 26B to the number 3 position, and resistances 25C, 25D are adjusted so that each has a value of zero. The system is then rebalanced as above described by adjustment of calibrated resistance $Zs$ for direct readout of the value of $Zs$ from scale 19. This use of the resistances 25A, 25B will take care of the situation where the unknown impedance is very high in value.

When the unknown impedance is low in value, it may be desirable to move the contacts of resistances 25A, 25B to the open-circuit positions and to set switches 26A, 26B to the number 2 position. At least one of the resistances 25C, 25D is now adjusted to give null response of the detector 15. Similarly, this adjustment will usually need only infrequent checking. Switches 26A, 26B are now placed in the number 3 position and the system is again rebalanced this time by adjusting the calibrated impedance $Zs$ for direct readout of the value of $Zs$ from scale 19.

It should be understood to those skilled in the art that the measurement of the unknown impedance $Zx$ may be made by interchanging the known impedance $Zs$ with resistance 25A or 25C, and correspondingly unknown impedance $Zx$ may be interchanged with the resistance 25B or 25D.

Referring to FIG. 2, for halfwaves of the AC source voltage for which source terminal 16 is positive with respect to source terminal 14A, one current path may be traced from terminal 16 through the parallel impedances $Zx$, 25C in parallel with impedance 25A to junction point 11, diode D1, terminal 12, detector 15 and back to terminal 14A. A second current path may be traced from terminal 16 through impedances $Zs$, 25D in parallel with impedance 25B, to terminal 13, diode D3, resistance 27 and back to terminal 14A. At balance, diode D2 is non-conductive because junction point 13 is more positive than junction point 12 and diode 4 is non-conductive because junction point 11 is more positive than junction point 14.

For halfwaves of the AC source voltage for which source terminal 14A is positive with respect to source terminal 16, one current path may be traced through resistance 27 to network terminal 14, diode D4, junction point 11, impedances 25C, $Zx$, in parallel with impedance 25A, and back to source terminal 16: a second current path may be traced from terminal 14A through detector 15, junction point 12, diode D2, point 13, impedances 25D, $Zs$, in parallel with impedance 25B, and back to source terminal 16. At balance, diode D1 is not conductive because junction point 12 is more positive than junction point 11, and diode D3 is not conductive because junction point 14 is more positive than junction point 13.

The alternate halfwaves of current respectively through the detector 15 are in opposite direction and hence effectively subtracted. In consequence, with impedance $Zs$ adjusted for null indication of detector 15, the unknown impedance $Zx$ is of equal value. If the circuitry is not balanced, the sense of indication by detector 15 indicates whether $Zs$ should be increased or decreased to obtain balance.

The embodiment shown in FIG. 3 is similar to FIGS. 1 and 2 except that the AC voltage source 17 is in series with the known and unknown impedances $Zs$, $Zx$ as connected between terminals 11, 13 of the diode-ring network 10 and effectively has an intermediate tap connected either directly to terminal 14, as in FIG. 1, or via a resistance 27, as in FIG. 2. The different manner of connection of the AC source results in important differences in circuit operation which will be hereinafter described. Specifically, in FIG. 3, the source of AC voltage is a voltage-divider network including the fixed resistance 17A and 17B and an intermediate slidewire resistance 17S having a relatively adjustable contact 17C. For simplicity of initial explanation, it is assumed that the slidewire 17S is set at the electrical mid-point and that the known and unknown impedances are equal.

For the voltage halfwaves for which source terminal 16B is positive with respect to source terminal 16A, current flows from source terminal 16A via impedance $Zs$, diode D3, diode D4 and impedance $Xx$. Under the conditions assumed, the potential of point 14 will be equal to that of point 14A, and no current flows through resistance 27. No current flows through the detector 15 via impedance $Zs$ and diode D2 because terminal 13 is positive with respect to terminal 12 and no current flows through detector 15 via diode D1 because terminal 12 is positive with respect to terminal 11.

For halfwaves for which source terminal 16A is positive with respect to source terminal 16B, current flows via impedance $Zx$ and diode D1 to terminal 12, diode D2, terminal 13, impedance $Zs$, and thence to terminal 16B. Under the assumed conditions, the potential of point 12 will be equal to that of point 14A, and no current flows through detector 15. The resultant null response of detector 15 indicates the equality of the known and unknown impedances $Zs$, $Zx$.

If the impedances $Zs$ and $Zx$ are not equal, the halfwaves resulting when terminal 16A is positive will undergo an IR drop from 16A to point 12 different from that between points 12 and 16B. Consequently, the potential of point 12 will not equal that of point 14A and some of the current will flow through the detector 15. The direction of current flow through the detector will depend on whether $Zx$ is greater or less than $Zs$. Hence, the detector will indicate the direction of unbalance. Similarly, the halfwaves resulting when terminal 16B is positive will undergo corresponding differences in IR drop in the two halves of the circuit, and the potential of point 14 will not equal that of point 14A. Some of the current will, therefore, flow through the resistance 27.

An advantage of the embodiment of FIG. 3 is that it may be used to measure the resistivity or conductivity of solutions using conductivity cells of cell constant value which varies from one cell to the next. For example, with $Zs$ at a known value corresponding to the conductivity or resistivity of the solution in the cell, a balance may be effected for cell constant variation by adjustment of slidewire contact 17C in one direction or the other from the electrical mid-point. The slidewire scale in this case is a ratio scale and its reading at balance is the multiplier to be applied to the known value of $Zs$ for determination of the value of the known impedance $Zs$. Equivalently, the slidewire 17S may be replaced by a tapped resistance or transformer winding with the settings of the associated switch indicating the multiplier for the readings of scale 19.

The circuit of FIG. 4 is basically similar to that of FIG. 1 but is not balanced for null measurement and includes additions and features suiting it for a deflection or ohmmeter mode of measurement of the solute concentration of very dilute aqueous solutions. FIG. 4 corresponds with FIG. 10 of my aforesaid copending application except that all diodes have been reversed and different reference characters are used for correspondence with FIGS. 1 and 2 hereof. The above description of the current paths of FIG. 1 is here applicable, and for brevity, is not repeated. In this species of the invention, per se claimed in my copending application, the unknown impedance $Zx$, is that of a conductivity cell whose plates 30, 30 are spaced in the solution under measurement and the known impedance $Zs$ is that of a resistance 31 having a non-linear temperature characteristic calculated to match that of theoretically pure water. The resistance 32 is connected in shunt to detector 15 and has a temperature coefficient compensatory of the changes of solute conductivity with changes of temperature. The resistances 31 and 32 are disposed in heat-transfer relation to the solution under measurement.

Figure 5:
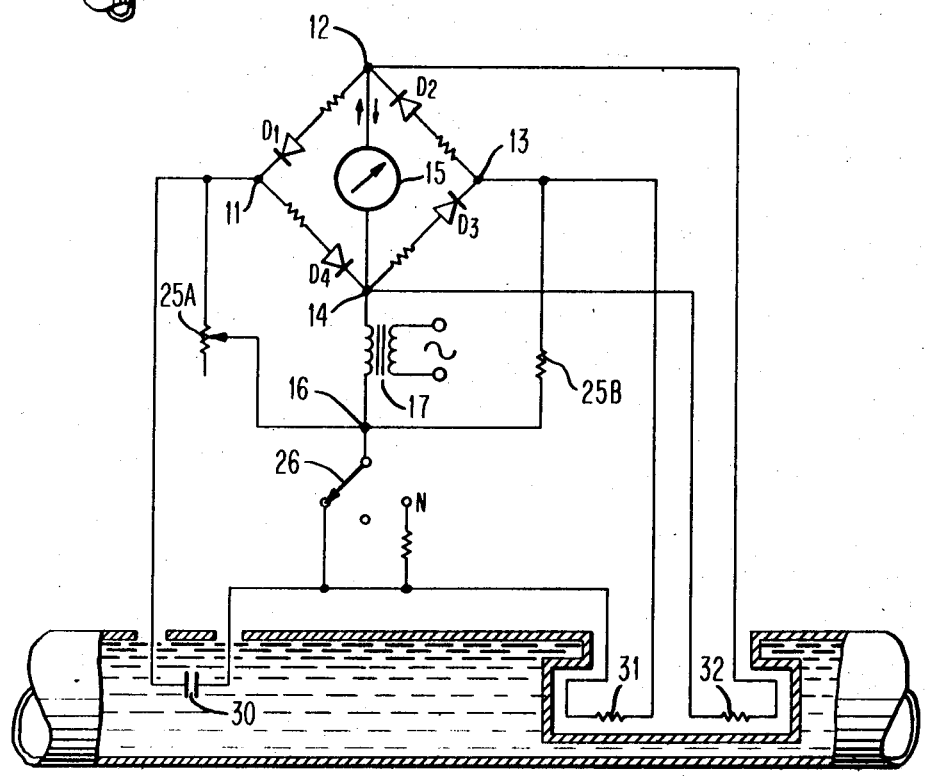
FIG. 5 is similar to the circuit of FIG. 3 with additional elements for conductivity measurements of dilute aqueous solutions.

The circuitry of FIG. 5 is basically similar to that of FIG. 3 but is not balanced for null measurement and includes additions and features suiting it for a deflection or ohmmeter mode of measurement of the solute concentration of very dilute aqueous solutions. FIG. 5 corresponds with FIG. 8 of my aforesaid copending application, but reference characters have been changed to correspond with FIG. 3 hereof. Again, as in FIG. 4, the unknown impedance $Zx$ is that of a conductivity cell whose spaced plates 30, 30 are in the solution under measurement; the known impedance $Zs$ is that of resistance 31 having a non-linear temperature characteristic calculated to match that of theoretically pure water; and resistance 32 in shunt to detector 15 has a temperature characteristic compensatory of the changes of solute conductivity with changes of temperature. Both of resistances 31, 32 are exposed to solution temperature.

For any of the circuits of FIGS. 1 to 3, the signals applied to detector 15 may instead, or additionally, be applied to known amplifier and reversible motor arrangements to effect automatic balancing adjustment of the calibrated impedance $Zs$ and concurrently to move a recording element with respect to a chart, so to record the magnitude and/or changes in magnitude of the unknown impedance $Zx$ as a function of any related variable. For recording purposes, it is preferable that the input terminals of the error-sensing amplifier be connected to terminals 12, 14 of network 10 in FIGS. 1 and 2. In general, these circuits are particularly suited for impedance measurements when the unknown impedance should be traversed by both halfwaves of the applied AC, but not by any residual DC.

What is claimed is:

1. A balanceable system for measuring impedance or the reciprocal thereof comprising
   a four-terminal network including a diode-ring,
   DC detector means connected between one pair of opposite terminals of said network,
   a calibrated impedance connected in series with an unknown impedance between another pair of two opposite terminals of said network,
   an AC current source effectively connected to one terminal of said first pair of network terminals and via said unknown and calibrated impedances respectively to said other two terminals of said network, and
   resistance means connected between a terminal of said source and the two ring-diodes which are connected to said one terminal of said first pair of network terminals, said resistance means having a value equal or substantially equal to the resistance of said detector means.

2. A system as in claim 1 in which one end of said AC source is connected to said one of said first two network terminals and at the other end to a common connection between said unknown and calibrated impedances.

3. A system as in claim 1 in which said AC source has an intermediate terminal effectively connected to said one terminal of the network and whose other terminals are respectively connected to said unknown and calibrated impedances.

4. A system as in claim 3 additionally having a continuously variable voltage-divider impedance connected to said AC source and providing said intermediate terminal thereof.

5. A system as in claim 1 in which said resistance means is in a common connection from said detector means to said one terminal of the network and from said AC source to said one terminal of the network.

6. A system as in claim 1 in which each of at least two arms of said network includes in series with the diode a resistance means for substantially matching the currents of the diodes in all arms.

7. A balanceable system as in claim 1 in which for measurement of high values of the unknown impedance,
   an additional adjustable calibrated impedance is connected in shunt to said unknown impedance to provide sufficient current insuring conduction by the diodes of said ring.

8. A balanceable system as in claim 1 in which for measurement of very low values of the unknown impedance,
   an additional adjustable calibrated impedance is connected in series with said unknown impedance to prevent damage to the diodes of said ring by excessive current.

9. A balanceable system as in claim 1 in which for measurement of intermediate values of unknown impedance,
   said calibrated impedance is adjustable for null response of said DC detector.

10. A system as in claim 1 in which said resistance means comprises two resistances, each connected within said diode-ring in series with one of said pair of ring-diodes and each having a value equal or substantially equal to the resistance of said detector means.

References Cited

UNITED STATES PATENTS

| 1,964,141 | 6/1934 | Rhodes et al. | 324—57 |
| 2,521,522 | 9/1950 | Keitley | 324—57 X |
| 2,563,281 | 8/1951 | Griffith | 73—304 X |
| 3,018,438 | 1/1962 | Mustert | 324—57 |
| 3,039,051 | 6/1962 | Locher | 324—61 |
| 3,119,267 | 1/1964 | Bartky | 324—61 X |
| 3,271,669 | 9/1966 | Lode | 324—60 |

EDWARD E. KUBASIEWICZ, Primary Examiner

U.S. Cl. X.R.

324—65